N. UPHAM.
Rotary-Pump or Motor.

No. 160,974. Patented March 16, 1875.

Witnesses.
Samuel B. Pitts
James Butler

Inventor.
Nehemiah Upham.

UNITED STATES PATENT OFFICE.

NEHEMIAH UPHAM, OF ATHOL, MASSACHUSETTS.

IMPROVEMENT IN ROTARY PUMPS OR MOTORS.

Specification forming part of Letters Patent No. 160,974, dated March 16, 1875; application filed November 30, 1874.

*To all whom it may concern:*

Be it known that I, NEHEMIAH UPHAM, of the town of Athol, State of Massachusetts, have invented an Improved Rotary Pump or Motor, of which the following is a specification:

My invention consists in so constructing the rotating rings G on which the radial pistons revolve that there will be no breaking of the connection between the ring and pistons, as is now the case with all connections made by inserting a pin in the end of the piston.

Figure 1:
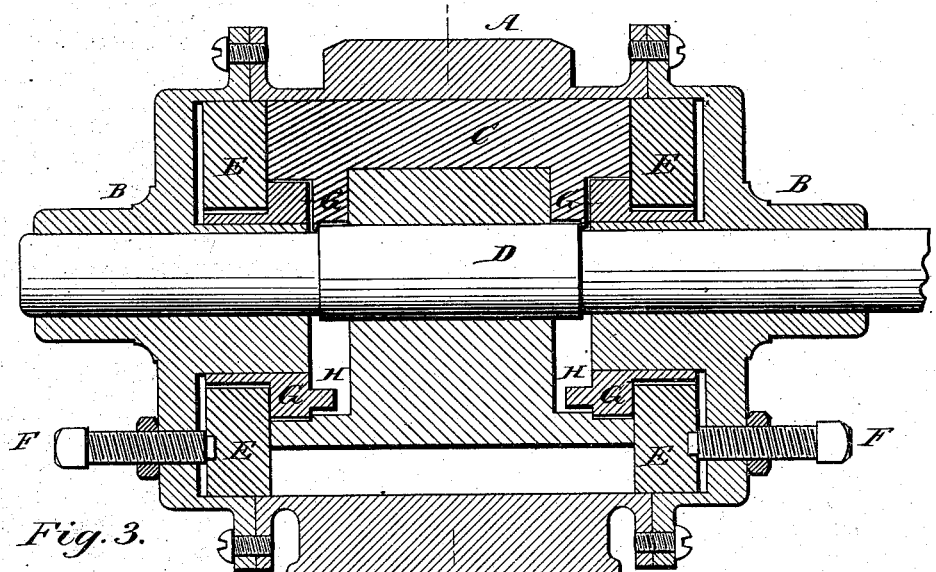
Figure 2:
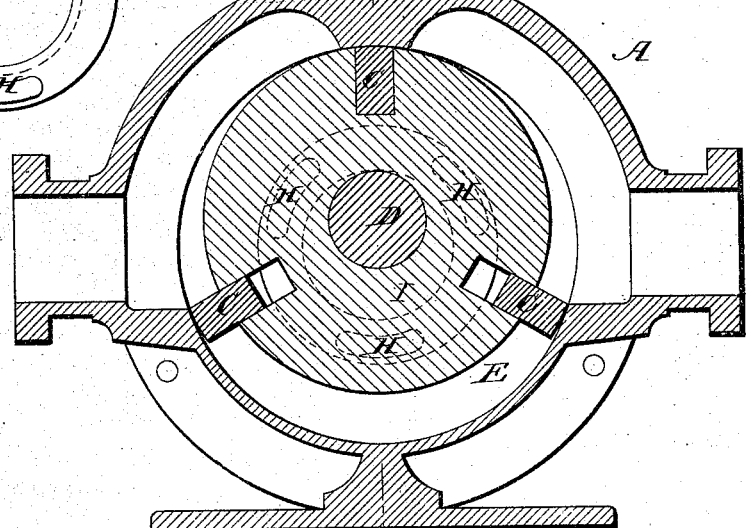

In the illustration, Figure 1 shows a vertical section longitudinally through the center of the pump, A representing the case; B, the heads and eccentrics, on which the rotating rings revolve. E E represent the packing, made of metal or other suitable material, also represented in Fig. 2, in plan, as circular; but in all cases its outer line should fit perfectly the inner lines of the case, and in a pump that has no rotating rings the hole I should be small enough so as to cover the hub of the revolving cylinders or pistons sufficiently to make a good packing-surface on the hub. The packing should, by means of the screws F F, or equivalents, be set close to the end of the piston C, rotating rings G G, and revolving cylinder or drum which carries the pistons, the length of which drum would correspond to the length of the pistons, thus forming a perfect packing for the working parts in the end of the pump or motor. This packing-plate should be of sufficient thickness to stand the pressure required, and allow for the usual wear of the working parts.

Figure 3:
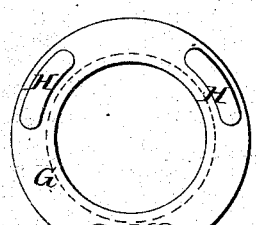

Fig. 3 represents a plan of the rotating ring G, showing the position of the projections or clutches H H, which are shown in Fig. 1 in working position, in combination with the extended part of the piston C, and should be in number equal to the number of pistons used. The rings may, however, be driven by a single piston, but will not be so durable.

In making this ring, the projections or clutches should be of the same piece of metal or other material as the ring, and large enough to give strength sufficient to move the ring by its connection with the pistons under any pressure that may be required in the pump.

I claim as my invention—

The rotating rings G G, provided with projections H H, in combination with the pistons and revolving cylinder, substantially as and for the purpose described.

NEHEMIAH UPHAM.

Witnesses:
  SAMUEL B. PITTS,
  JAMES BUTLER.